United States Patent
Shimomugi et al.

(10) Patent No.: US 10,128,775 B2
(45) Date of Patent: Nov. 13, 2018

(54) MOTOR DRIVE APPARATUS AND AIR CONDITIONER

(71) Applicant: Mitsubishi Electric Corporation, Tokyo (JP)

(72) Inventors: Takuya Shimomugi, Tokyo (JP); Yosuke Shinomoto, Tokyo (JP); Koichi Arisawa, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/506,357

(22) PCT Filed: Nov. 4, 2014

(86) PCT No.: PCT/JP2014/079268
§ 371 (c)(1),
(2) Date: Feb. 24, 2017

(87) PCT Pub. No.: WO2016/071963
PCT Pub. Date: May 12, 2016

(65) Prior Publication Data
US 2017/0279377 A1    Sep. 28, 2017

(51) Int. Cl.
*H02M 7/5395* (2006.01)
*H02M 7/5387* (2007.01)
(Continued)

(52) U.S. Cl.
CPC .......... *H02M 7/53875* (2013.01); *H02K 5/18* (2013.01); *H02M 1/088* (2013.01);
(Continued)

(58) Field of Classification Search
USPC .............. 363/34, 39, 40, 41, 78, 95, 97, 131
See application file for complete search history.

(56) References Cited

U.S. PATENT DOCUMENTS 7,548,443 B2 * 6/2009 Arisawa ............ H02M 7/53875
363/132
7,606,052 B2 * 10/2009 Akagi ..................... H02M 1/12
363/40

(Continued)

FOREIGN PATENT DOCUMENTS

CN          102545671 A       7/2012
EP          0524398 A2        1/1993
(Continued)

OTHER PUBLICATIONS

Office Action dated Aug. 8, 2017 issued in corresponding JP patent application No. 2016-557377 (and English translation).
(Continued)

*Primary Examiner* — Adolf Berhane
(74) *Attorney, Agent, or Firm* — Posz Law Group, PLC

(57) ABSTRACT

A motor drive apparatus driving a motor as a three-phase motor converting direct current into three-phase alternating current, includes: inverter modules and equivalent in number to phases of the motor; and a control unit generating PWM signals used to drive the inverter modules with PWM. The inverter modules each include a plurality of switching element pairs connected in parallel, each of the switching element pairs including two switching elements connected in series.

16 Claims, 6 Drawing Sheets

(51) Int. Cl.
  *H02M 7/48* (2007.01)
  *H02K 5/18* (2006.01)
  *H02P 27/08* (2006.01)
  *H02M 1/088* (2006.01)
  *H02M 7/00* (2006.01)
  *H02P 25/16* (2006.01)
  *H02M 1/00* (2006.01)

(52) U.S. Cl.
  CPC ............. *H02M 7/003* (2013.01); *H02M 7/48* (2013.01); *H02P 25/16* (2013.01); *H02P 27/08* (2013.01); *H02M 7/5395* (2013.01); *H02M 7/53871* (2013.01); *H02M 2001/008* (2013.01); *H02M 2001/0009* (2013.01); *H02M 2007/53876* (2013.01)

(56) References Cited

U.S. PATENT DOCUMENTS

| | | | |
|---|---|---|---|
| 7,990,097 B2 * | 8/2011 | Cheng | H02M 5/4585 318/800 |
| 8,159,840 B2 | 4/2012 | Yun | |
| 8,345,452 B2 * | 1/2013 | Alexander | H02M 3/1582 363/124 |
| 8,514,601 B2 * | 8/2013 | Alexander | H02M 5/225 363/132 |
| 9,077,274 B2 * | 7/2015 | Shinomoto | F25B 49/025 |
| 9,531,305 B2 | 12/2016 | Ajima et al. | |
| 9,628,003 B2 * | 4/2017 | Shinomoto | H02P 6/12 |
| 9,780,717 B2 * | 10/2017 | Uemura | H02P 27/08 |
| 2005/0047182 A1 | 3/2005 | Kraus et al. | |
| 2005/0231152 A1 * | 10/2005 | Welchko | B60K 6/26 318/801 |
| 2005/0281067 A1 * | 12/2005 | Deng | H02M 7/53875 363/131 |
| 2007/0189044 A1 * | 8/2007 | Liu | H02M 5/4585 363/34 |
| 2009/0237962 A1 | 9/2009 | Yun | |
| 2011/0292697 A1 * | 12/2011 | Alexander | H02M 5/275 363/37 |
| 2011/0299311 A1 | 12/2011 | Zhu et al. | |
| 2011/0310585 A1 * | 12/2011 | Suwa | H05K 7/1432 361/820 |
| 2012/0081061 A1 * | 4/2012 | Zargari | H02J 3/01 318/503 |
| 2012/0187893 A1 | 7/2012 | Baba et al. | |
| 2013/0128628 A1 * | 5/2013 | Venhaus | H02M 7/49 363/34 |
| 2014/0161646 A1 * | 6/2014 | Taillardat | H02P 27/14 417/410.1 |
| 2014/0239861 A1 | 8/2014 | Ajima et al. | |
| 2017/0016655 A1 * | 1/2017 | Shinomoto | H02M 1/12 |
| 2017/0272006 A1 * | 9/2017 | Uemura | H02M 7/53871 |
| 2017/0366082 A1 * | 12/2017 | Liu | H02P 7/04 |
| 2018/0026557 A1 * | 1/2018 | Paschedag | H02P 5/505 |

FOREIGN PATENT DOCUMENTS

| | | |
|---|---|---|
| EP | 1 863 156 A1 | 12/2007 |
| JP | 5-82143 U | 11/1993 |
| JP | 2001-060659 A | 3/2001 |
| JP | 2006-149199 A | 6/2006 |
| JP | 2009-135626 A | 6/2009 |
| JP | 2009-232681 A | 10/2009 |
| JP | 2009-261106 A | 11/2009 |
| JP | 2010-226899 A | 10/2010 |
| JP | 4675902 B2 | 4/2011 |
| JP | 2013-115410 A | 6/2013 |
| JP | 2013-162690 A | 8/2013 |
| JP | 2014-168332 A | 9/2014 |
| KR | 101361940 B1 | 2/2014 |
| WO | 2006/103721 A1 | 10/2006 |

OTHER PUBLICATIONS

International Search Report of the International Searching Authority dated Jan. 20, 2015 for the corresponding international application No. PCT/JP2014/079268. (and English translation).

Extended European Search Report dated Jun. 12, 2018 issued in corresponding EP patent application No. 14905435.5.

Office Action dated Aug. 29, 2018, 2018 issued in corresponding KR patent application No. 10-2017-7011027 (and English machine translation).

* cited by examiner

MOTOR DRIVE APPARATUS AND AIR CONDITIONER

CROSS REFERENCE TO RELATED APPLICATION

This application is a U.S. national stage application of International Patent Application No. PCT/JP2014/079268 filed on Nov. 4, 2014, the disclosure of which is incorporated herein by reference.

FIELD

The present invention relates to a motor drive apparatus that includes a switching element and to an air conditioner.

BACKGROUND

There is known a technique for driving a motor by pulse width modulation (PWM) control using switching elements. Patent Literature 1 discloses an example of PWM control.

In a case where the switching elements are implemented as chips, as the chip area increases, it causes a decrease in the yield. If the chip area is reduced, it can improve the yield when the chips are diced from the wafer and can thus achieve a reduction in cost.

CITATION LIST

Patent Literature

Patent Literature 1: Japanese Patent No. 4675902

SUMMARY

Technical Problem

With the conventional technique, when the switching elements are implemented as chips, a cost reduction can be achieved by reducing the chip area. The decrease in the chip area however causes a decrease in the current capacity. Therefore, it has been difficult to achieve both a reduction in cost and an increase in current with a motor drive apparatus that includes switching elements.

The present invention has been made in view of the above, and an object of the present invention is to obtain a motor drive apparatus that can achieve both a reduction in cost and an increase in current.

Solution to Problem

In order to solve the above problems and achieve the object, an aspect of the present invention is a motor drive apparatus driving a motor, including: inverter modules equivalent in number to phases of the motor; and a control unit generating a PWM signal used to drive the inverter modules with PWM. The inverter modules each include a plurality of switching element pairs connected in parallel, each of the switching element pairs including two switching elements connected in series.

Advantageous Effects of Invention

An effect of the motor drive apparatus according to the present invention is the ability to achieve both a reduction in cost and an increase in current.

DESCRIPTION OF EMBODIMENTS

A motor drive apparatus and an air conditioner according to embodiments of the present invention will now be described in detail with reference to the drawings. Note that the present invention is not to be limited by the embodiments.

First Embodiment

Figure 1:
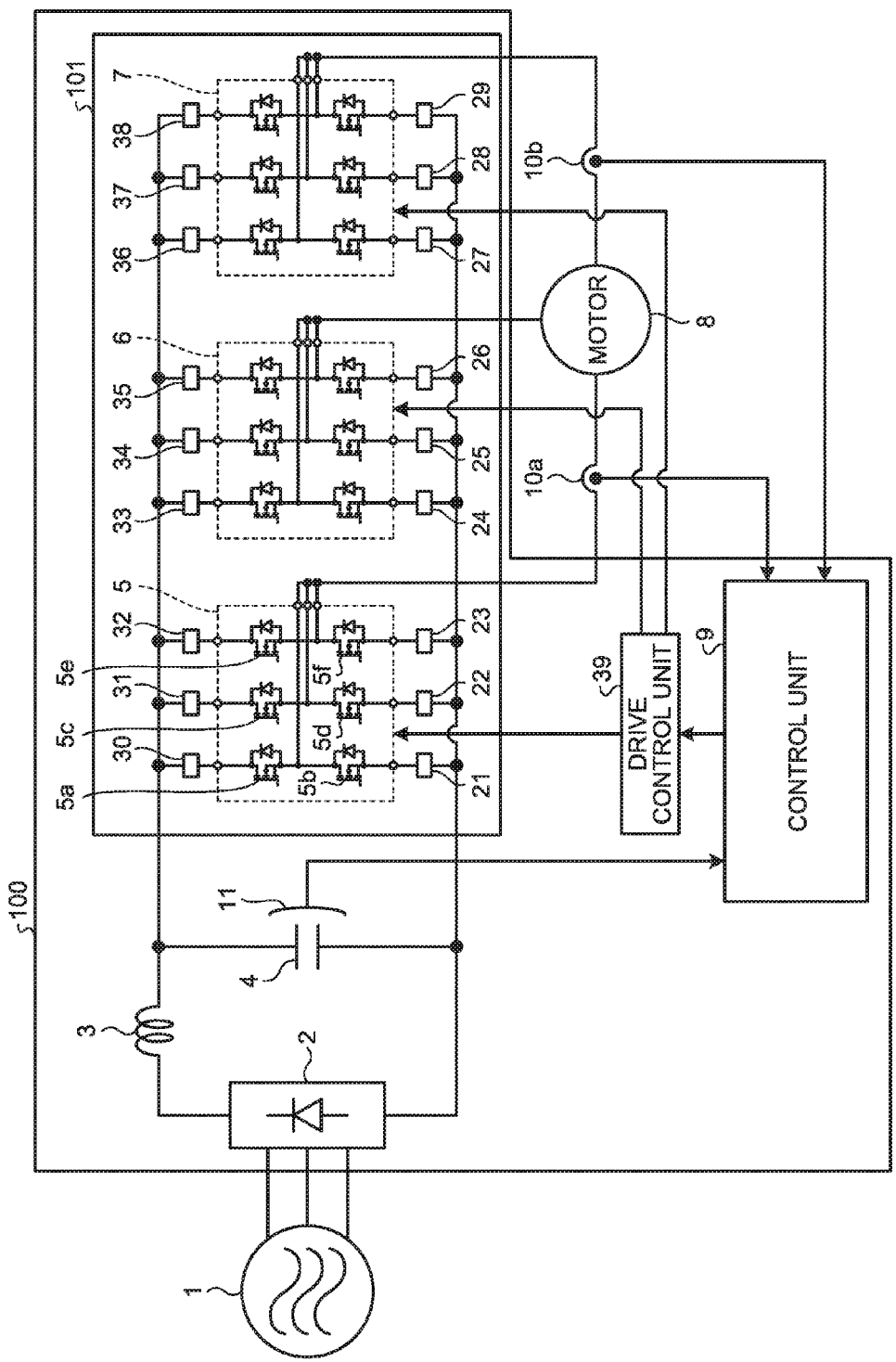
FIG. 1 is a diagram illustrating an example of the configuration of a motor drive apparatus according to a first embodiment.

FIG. 1 is a diagram illustrating an example of the configuration of a motor drive apparatus according to a first embodiment of the present invention. As illustrated in FIG. 1, a motor drive apparatus 100 of the present embodiment includes a rectifier 2 that rectifies alternating current input from an AC power supply 1 to direct current; a reactor 3; a capacitor 4; a voltage detector 11 that detects voltage across the capacitor 4; an inverter unit 101 that converts the direct current into three-phase alternating current and drives a motor 8 that is a three-phase motor; a control unit 9 that generates PWM signals used to control the inverter unit 101; current measurement units 21 to 38; and a drive control unit 39. Current measurement units 10a and 10b measuring motor current are provided between the inverter unit 101 and the motor 8.

The motor drive apparatus 100 of the present embodiment can be used as an apparatus that drives a motor in an appliance, such as an air conditioner, a freezing machine, a washer/dryer, a refrigerator, a dehumidifier, a heat pump water heater, a showcase, a vacuum cleaner, a fan motor, a ventilator, a hand dryer, or an induction heating cooker.

The inverter unit 101 includes an inverter module 5 corresponding to a U phase, an inverter module 6 corresponding to a V phase, and an inverter module 7 corresponding to a W phase. Each of the inverter modules 5, 6, and 7 includes switching elements 5a, 5b, 5c, 5d, 5e, and 5f. The switching elements 5a, 5c, and 5e make up an upper arm, and the switching elements 5b, 5d, and 5f make up a lower arm. The present embodiment can achieve a high current capacity by arranging the switching elements in parallel for each phase as illustrated in FIG. 1, even when the individual current capacity of each of the switching elements 5a, 5b, 5c, 5d, 5e, and 5f is small. The inverter modules 6 and 7 each have a similar configuration to the inverter module 5. Note that for the sake of simplicity, reference numerals in the inverter modules 6 and 7 are omitted in FIG. 1.

The current measurement units 21, 22, and 23 measure the current flowing through the switching elements 5b, 5d, and 5f in the lower arm of the inverter module 5; the current measurement units 24, 25, and 26 measure the current flowing through the switching elements 5b, 5d, and 5f in the lower arm of the inverter module 6; and the current measurement units 27, 28, and 29 measure the current flowing through the switching elements 5b, 5d, and 5f in the lower arm of the inverter module 7. The current measurement units 30, 31, and 32 measure the current flowing through the switching elements 5a, 5c, and 5e in the upper arm of the inverter module 5; the current measurement units 33, 34, and 35 measure the current flowing through the switching elements 5a, 5c, and 5e in the upper arm of the inverter module 6; and the current measurement units 36, 37, and 38 measure the current flowing through the switching elements 5a, 5c, and 5e in the upper arm of the inverter module 7.

The control unit 9 controls the inverter unit 101 on the basis of the voltage detected by the voltage detector 11 and the motor current measured by each of the current measurement units 10a and 10b. Specifically, the control unit 9 generates PWM signals Up, Vp, Wp, Un, Vn, and Wn that are used to control the on/off state of the switching elements in each phase and arm, and outputs the signals to the inverter unit 101. The signals Up, Vp, and Wp are the PWM signals used to control the on/off state of the switching elements in the upper arm of the U, V, and W phases, and the signals Un, Vn, and Wn are the PWM signals used to control the on/off state of the switching elements in the lower arm of the U, V, and W phases. The PWM signal is a pulsed signal that has either a high value indicating an on state (or closed state) or a low value indicating an off state (or open state). The width of a period for which the pulse or the on state continues is referred to as the pulse width. Because three switching elements are provided in the same arm in the same phase, the control unit 9 determines the pulse width on the basis of the current flowing when the three switching elements are turned on. In other words, the PWM signal is generated while the three switching elements are treated as one switching element with a high current capacity.

The drive control unit 39 generates PWM signals used to drive the switching elements 5a, 5b, 5c, 5d, 5e, and 5f with PWM for each phase, i.e., each of the inverter modules 5, 6, and 7, on the basis of the PWM signals generated by the control unit 9. Specifically, the drive control unit 39 replicates the signals Up and Un in order to generate three of each of the signals Up and Un, and outputs the replicated signals to the inverter module 5 corresponding to the U phase. The drive control unit 39 replicates the signals Vp and Vn in order to generate three of each of the signals Vp and Vn, and outputs the replicated signals to the inverter module 6 corresponding to the V phase. The drive control unit 39 replicates the signals Wp and Wn in order to generate three of each of the signals Wp and Wn, and outputs the replicated signals to the inverter module 7 corresponding to the W phase. When any imbalance in the current flowing through the inverter modules 5, 6, and 7 is to be suppressed, the drive control unit 39 adjusts the pulse width of the replicated signals (to be described later) and outputs the signals, the pulse width of which has been adjusted, to the inverter modules 5, 6 and 7.

Any element may be used as the switching elements, and a wide band-gap semiconductor such as gallium nitride (GaN), silicon carbide (SiC), or diamond can be used as the switching elements. The use of the wide band-gap semiconductor increases the voltage resistance and allowable current density so as to thus be able to reduce the size of the modules. The wide band-gap semiconductor also has high heat resistance so as to be able to reduce the size of the heat dissipating fins of the heat dissipation unit.

Here, a general inverter that drives a three-phase motor will be described as a comparative example. When an inverter is used to drive a three-phase motor, the inverter generally includes, for each phase, a pair of switching elements made up of a switching element in an upper arm and a switching element in a lower arm that are connected in series. The inverter of the comparative example therefore has three pairs of, i.e., six, switching elements in total for three phases. On the other hand, in a case where the switching elements are implemented as chips, an increase in the chip area causes a decrease in the yield. If the chip area is reduced, it can improve the yield when the chips are diced from a wafer. In particular, when SiC is used for the switching elements, the wafer is expensive; therefore, it is desirable to reduce the chip area in order to achieve a cost reduction. When a low current capacity is possible, such as when the inverter module is used in a household air conditioner, a cost reduction can be achieved by using an inverter module that controls three phases with six switching elements that have a small chip area.

A reduction in the chip area however causes a decrease in the current capacity. It is thus difficult to achieve both a reduction in cost and an increase in current with the inverter module of the comparative example or with an inverter module driving a three-phase motor by using six switching elements. In the present embodiment, in contrast, a reduction in cost and an increase in current can both be achieved by using the switching elements each with low current capacity in parallel. Moreover, as illustrated in FIG. 1, the single three-phase inverter module made up of six switching elements illustrated in the comparative example and the inverter modules 5, 6, and 7 each made up of six switching elements illustrated in the present embodiment can have a common basic part. The single three-phase inverter module made up of the six switching elements can thus be used as is or, upon making a simple modification to the module, as each of the inverter modules 5, 6, and 7. In other words, the single three-phase inverter module and each of the inverter modules 5, 6, and 7 illustrated in FIG. 1 can be manufactured as identical or similar modules. The inverter modules 5, 6, and 7 adapted for the high current capacity can thus be manufactured at a low cost. The single three-phase module made up of the six switching elements can be used in a household air conditioner, while the inverter unit 101 including the three modules as illustrated in FIG. 1 can be used in an industrial air conditioner, for example. In order to distinguish the inverter unit 101 of the present embodiment, the inverter using a single pair of switching elements in each phase as illustrated in the comparative example will be hereinafter referred to as a single pair inverter, whereas the module implementing the switching elements for three phases, i.e., three pairs of switching elements as one module, will be referred to as a single inverter module.

The inverter module 5 includes three pairs of switching elements as illustrated in FIG. 1. The single pair inverter includes one switching element in an upper arm of the same phase and one switching element in a lower arm of the same phase. On the other hand, the preset embodiment includes three switching elements in the upper arm of the same phase and three switching elements in the lower arm of the same phase. Accordingly, when Am represents the current capacity of a switching element that is implemented, the ideal current capacity of the inverter module including three switching elements connected in parallel equals 3×Am.

Note that although FIG. 1 illustrates an example where the drive control unit 39 has the function of generating the individual PWM signals used to drive the switching elements 5a, 5b, 5c, 5d, 5e, and 5f with PWM on the basis of the PWM signals generated by the control unit 9, the control unit 9 may instead have the function of generating the individual PWM signals. Alternatively, the inverter modules 5, 6, and 7 may each include a drive control unit with the function of generating the individual PWM signals. Note that when each of the inverter modules 5, 6, and 7 includes the drive control unit with the function of generating the individual PWM signals and adjusts the pulse width to suppress the current imbalance, the current value measured by each of the current measurement units 21 to 38 is input to the corresponding inverter module 5, 6, or 7 or each of the current measurement units 21 to 38 is provided in the corresponding inverter module 5, 6, or 7. The area of a substrate can be reduced when the drive control unit is provided in each of the inverter modules 5, 6, and 7.

In the present embodiment, three switching elements in the same arm of the same phase implement an operation similar to that of a single switching element in the single inverter module. That is, the three switching elements in the same arm of the same phase implement the same operation. Accordingly, the three switching elements in the same arm of the same phase have substantially the same current flowing through the elements. In reality, however, a difference in a condition such as temperature causes a difference in the current flowing through the three switching elements even when the three switching elements in the same arm of the same phase perform the same operation. That is, a current imbalance is generated among the three switching elements in the same arm of the same phase.

In particular, when a switching element such as a switching element made of SiC is used, which has a characteristic such that when its temperature increases due to the current flowing therein, the on-resistance decreases and thus current flow is further facilitated, i.e., a negative temperature characteristic, the current imbalance that occurs further causes an increase in the temperature of an element through which a large current flows and thus an increase in the current flowing through the element. The same can be said for a case where a switching element with the negative temperature characteristic such as an insulated gate bipolar transistor (IGBT) made of Si is used instead of a switching element made of SiC. In order for each of the switching elements to not exceed the current capacity in the event of a current imbalance, it is necessary to set the current capacity of the entire inverter module to a value obtained by subtracting a margin from the ideal value 3×Am. It is however desirable that the value of the margin be low in order to increase the current capacity of the inverter module. Accordingly, in order to suppress the current imbalance, the present embodiment measures the current flowing through the switching elements and controls the pulse width on the basis of the current. Note that the pulse width control based on the current flowing through the switching elements according to the present embodiment may be performed when a switching element without a negative temperature characteristic is used.

Next, there will be a description of the adjustment of the pulse width for the switching elements 5b, 5d, and 5f in the lower arm of the U phase as an example of the adjustment of the pulse width. On the basis of the value of the current flowing through each of the switching elements 5b, 5d, and 5f, i.e., the measurement made by each of the current measurement units 21, 22, and 23, the drive control unit 39 reduces the pulse width of the PWM signal for the switching element with a large current value and increases the pulse width of the PWM signal for the switching element with a small current value. Although two examples will be described below, specific methods of adjusting the pulse width may be performed in any order as long as the methods reduce the pulse width of the PWM signal for the switching element with a large current value and increase the pulse width of the PWM signal for the switching element with a small current value.

The first example is a method of adjusting the pulse width for the largest and the smallest of the measurements made by the current measurement units 21, 22, and 23, i.e., the values of the current flowing through the switching elements 5b, 5d, and 5f. The drive control unit 39 obtains the current difference $\Delta I$ between the largest and the smallest of the measurements made by the current measurement units 21, 22, and 23. Note that the current difference $\Delta I$ is the absolute value of a difference between the current values. The drive control unit 39 then obtains an amount of increase/decrease $p\alpha$ of the pulse width equivalent to one-half of the current difference $\Delta I$ that is obtained. The drive control unit 39 may store a relationship between the pulse width and the current in advance and use the relationship to obtain the amount of increase/decrease $p\alpha$ of the pulse width equivalent to one-half of the current difference $\Delta I$, or it may store a table including $\Delta I$ and the amount of increase/decrease of the pulse width and refer to the table to obtain the amount of increase/decrease of the pulse width. The drive control unit 39 replicates the PWM signal Un output from the control unit 9 in order to generate three PWM signals and increases or reduces the pulse width of each of the three PWM signals by using the amount of increase/decrease $p\alpha$ of the pulse width.

Figure 2:
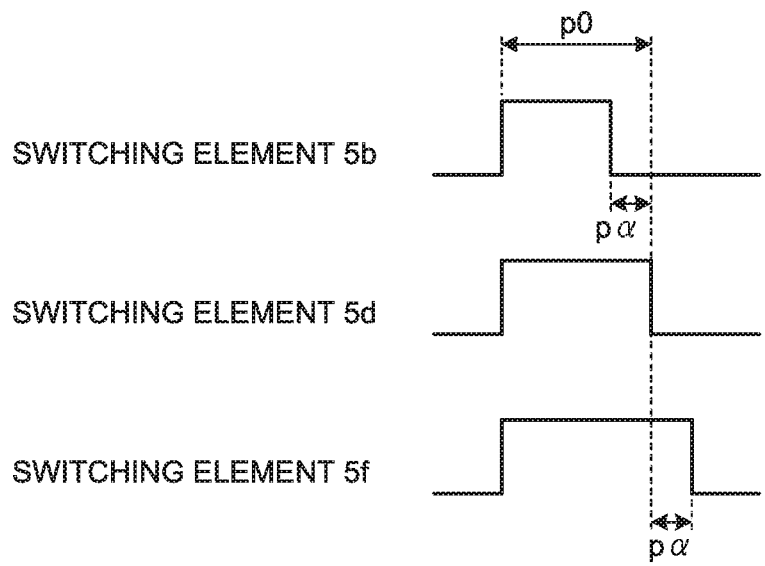
FIG. 2 is a diagram illustrating an example, according to the first embodiment, of PWM signals used to drive switching elements after the pulse width is increased or reduced.

FIG. 2 is a diagram illustrating an example of the PWM signals used to drive the switching elements 5b, 5d, and 5f after the pulse width is increased or reduced. A p0 indicates the pulse width of the PWM signal used to drive the switching elements 5b, 5d, and 5f before the pulse width is increased or reduced, i.e., the PWM signal output from the control unit 9. FIG. 2 illustrates an example where, among the switching elements 5b, 5d, and 5f, the switching element 5b has the largest current value, the switching element 5d has the second largest current value, and the switching element 5f has the smallest current value. That is, among the measurements made by the current measurement units 21, 22, and 23, it is assumed that the measurement made by the current measurement unit 21 is the largest, the measurement made by the current measurement unit 22 is the second largest, and the measurement made by the current measurement unit 23 is the smallest. The drive control unit 39 obtains the current difference $\Delta I$ between the measurement made by the current measurement unit 21 and the measurement made by the current measurement unit 23. The drive control unit 39 then obtains the amount of increase/decrease $p\alpha$ of the pulse width corresponding to the current difference $\Delta I$ to increase the pulse width of the switching element 5f by the amount of increase/decrease $p\alpha$ and reduce the pulse width of the switching element 5b by the amount of increase/decrease $p\alpha$.

The second example is a method of reducing the pulse width of the PWM signal for the switching element with the largest current value among the values of the current flowing through the switching elements 5b, 5d, and 5f and increasing the pulse width of the PWM signals for the remaining two switching elements. That is, the second example is a method of adjusting the pulse width for each of the three switching elements. First, as with the first example, the drive control unit 39 obtains the current difference ΔI between the largest and the smallest of the measurements made by the current measurement units 21, 22, and 23. The drive control unit 39 then obtains the amount of increase/decrease pα of the pulse width corresponding to the current difference ΔI. The drive control unit 39 reduces the pulse width of the PWM signal for the switching element with the largest current value by the amount pα. The drive control unit 39 then increases the pulse width of the PWM signals for the two switching elements other than the switching element with the largest current value. At this time, with pβ1 representing the amount of increase of the pulse width for the switching element with the second largest current value and pβ2 representing the amount of increase of the pulse width for the switching element with the smallest current value, the drive control unit 39 determines pβ1 and pβ2 such that pα=pβ1+pβ2 is satisfied. The ratio of pβ1 to pβ2 may be determined in any manner, and an example is using the ratio of the differences in the current values between each of the switching elements and the switching element with the largest current value.

Figure 3:
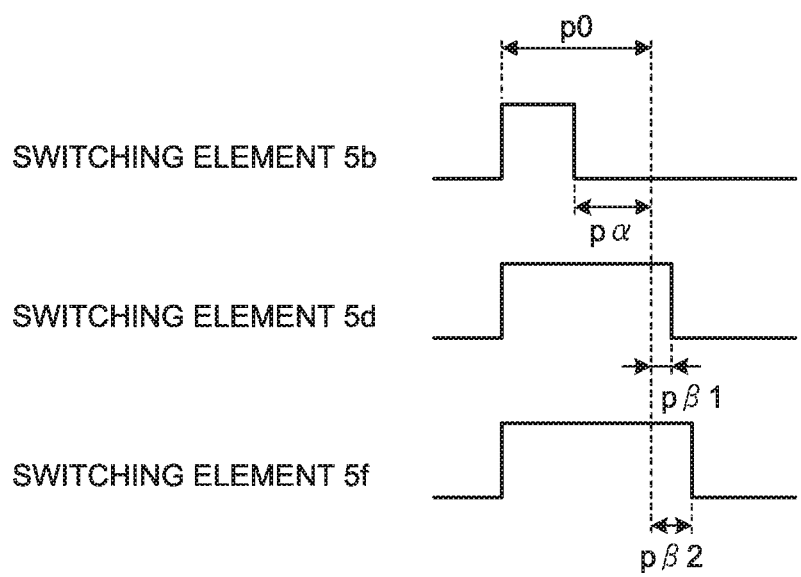
FIG. 3 a diagram illustrating an example, when the pulse width of three switching elements of the first embodiment is adjusted, of PWM signals used to drive the switching elements after the pulse width is increased or reduced.

FIG. 3 is a diagram illustrating an example, when the pulse width of the three switching elements is adjusted, of the PWM signals used to drive the switching elements 5b, 5d, and 5f after the pulse width is increased or reduced. As with the example illustrated in FIG. 2, FIG. 3 illustrates an example where, among he switching elements 5b, 5d, and 5f, the switching element 5b has the largest current value, the switching element 5d has the second largest current value, and the switching element 5f has the smallest current value. The drive control unit 39 obtains the current difference ΔI between the largest and the smallest of the measurements made by the current measurement units 21, 22, and 23, and obtains the amount of increase/decrease pα of the pulse width corresponding to the current difference ΔI. The drive control unit 39 further determines pβ1 and pβ2 such that pα=pβ1+pβ2 is satisfied. Here, assuming that the ratio of pβ1 to pβ2 is determined by the ratio of the differences in the current values with ΔI1 representing the absolute value of a difference in the current values between the switching element 5d and the switching element 5b and ΔI2 representing the absolute value of a difference in the current values between the switching element 5f and the switching element 5d, pβ1 and pβ2 can be determined from the following expressions (1) and (2).

$$p\beta1:p\beta2=\Delta I1:\Delta I2, \text{ or } p\beta1=p\alpha\times\Delta I1/\Delta I \quad (1)$$

$$p\alpha=p\beta1+p\beta2 \quad (2)$$

The drive control unit 39 reduces the pulse width of the switching element 5b by the amount of increase/decrease pα, increases the pulse width of the switching element 5d by the amount of increase/decrease pβ1, and increases the pulse width of the switching element 5f by the amount of increase/decrease pβ2.

The method of increasing or reducing the pulse width has been described as an example. Alternatively, the following method may, for example, be used. That is, the value of the current itself flowing through a switching element is used instead of the difference in the current values, and, when the value of the current flowing through the switching element equals a threshold or larger, the pulse width of the switching element is reduced by a fixed value and the pulse width of the other switching elements is increased by a fixed value.

The drive control unit 39 performs the aforementioned pulse width adjustment at regular time intervals. The regular time interval may be set equal to a carrier cycle or longer. Control, for example, may be performed such that, every minute, the pulse width is adjusted for 10 seconds and not adjusted for the remaining 50 seconds, i.e., the PWM signals output from the control unit 9 are left as they are. Alternatively, in order to simplify processing, an adjustment may be performed in which the pulse width is not adjusted when ΔI is smaller than a threshold and, when ΔI exceeds the threshold, the pulse width for the switching element with the largest current is reduced by a fixed value while the pulse width for the switching element with the smallest current is increased by a fixed value.

Note that although the drive control unit 39 outside the inverter module 5 adjusts the pulse width or increases/reduces the pulse width in the example illustrated in FIG. 1, the pulse width may instead be adjusted inside the inverter module 5. In this case, a signal indicating the measurement made by each of the current measurement units 21, 22, and 23 is input to the inverter module 5. Instead of inputting the measurement itself made by each of the current measurement units 21, 22, and 23, a signal indicating the switching element with the largest current value among the switching elements 5b, 5d, and 5f or a signal indicating the switching element with the largest current value as well as the difference ΔI in the current values may be output to an external location on the basis of the measurements made by the current measurement units 21, 22, and 23. The configuration may be, for example, such that the value of the signal indicating the switching element with the largest current value is set to 4.5 V when the switching element 5b is the switching element with the largest current value, is set to 2.5 V when the switching element 5d is the switching element with the largest current value, and is set to 0.5 V when the switching element 5f is the switching element with the largest current value. When the signal is used to further indicate the difference in the current values, each of the ranges from 0.5 V to 2.5 V, from 2.5 V to 4.5 V, and from 4.5 V to larger values may be divided into a plurality of levels to indicate the difference in the current values by using the voltage difference with respect to 0.5 V, 2.5 V, or 4.5 V.

The method of adjusting the pulse width for each of the switching elements 5a, 5c, and 5e in the upper arm is similar to the method of adjusting the pulse width for each of the switching elements 5b, 5d, and 5f in the lower arm. Moreover, the method of adjusting the pulse width for each of the V phase and the W phase is similar to the method of adjusting the pulse width for the U phase.

Although the drive control unit 39 replicates the PWM signals and adjusts the pulse width in the example illustrated in FIG. 1, the control unit 9 may instead replicate each of the PWM signals Up, Vp, Wp, Un, Vn, and Wn in order to generate three of each of the PWM signals and adjust the pulse width of each of the PWM signals. Moreover, although the drive control unit 39 replicates the PWM signals for three phases and adjusts the pulse width thereof in the example illustrated in FIG. 1, the drive control unit may instead be provided for each phase so that each drive control unit replicates the PWM signals for a corresponding phase and adjusts the pulse width of the signals.

It may also be adapted to stop the operation of the motor drive apparatus when at least one of the currents detected by the current measurement units 21 to 38 exceeds the allowed value. The operation can be stopped on the basis of the detection of the current with a fast response speed and thus can be stopped promptly in the event of an irregularity in order to be able to prevent the elements from being damaged. Smoke emissions and catching fire associated with the irregularity can also be prevented. Alternatively, when at least one of the currents detected by the current measurement units 21 to 38 exceeds the allowed value, the operation of only the inverter module of a corresponding phase may be stopped and the operation may be continued by using the remaining phases. As a result, safety of the appliance can be ensured without stopping the operation of the appliance and making a user feel inconvenienced.

As described above, the motor drive apparatus of the present embodiment includes, for each phase, an inverter module in which a plurality of pairs of an upper-arm switching element and a lower-arm switching element are connected in parallel. An increase in current can thus be achieved while keeping the cost down. Moreover, the current imbalance is suppressed by measuring the current flowing through the switching elements. Therefore, the current imbalance need not be taken into consideration when the current capacity of the inverter module is determined, whereby the current capacity of each switching element can be used effectively.

Note that although FIG. 1 illustrates an example where the inverter module for one phase is configured to include three pairs of switching elements, the configuration is not limited thereto and it is satisfactory if the inverter module for one phase includes a plurality of pairs of switching elements. As an example, one inverter module made up of two pairs of switching elements, i.e., four elements in total, may be used as an inverter module for one phase. In this case, the inverter module can also be used as a two-phase inverter module having a low current capacity and made up of four switching elements. Moreover, although FIG. 1 illustrates an example of the configuration in which the motor 8 is a three-phase motor, the motor 8 is not limited to a three-phase motor and a reduction in cost and an increase in current can be achieved as with the example in FIG. 1 by using the inverter modules corresponding in number to the phases.

Although FIG. 1 illustrates an example of the configuration in which one inverter module is used for one phase, a plurality of inverter modules may be provided for one phase. As an example, two inverter modules connected in parallel may be used for one phase such that the number of inverter modules used equals twice the number of phases. Moreover, although FIG. 1 illustrates an example of the configuration where the alternating current from the AC power supply 1 is rectified by the rectifier 2, this is not a limitation as long as the direct current is input to the inverter modules 5, 6, and 7, and the configuration may be such that the direct current is input to the inverter modules 5, 6, and 7 from a DC power supply.

Second Embodiment

A motor drive apparatus according to a second embodiment of the present invention will now be described. The first embodiment illustrates an example where a current measurement unit measuring the current is provided for each switching element, but the description of the present embodiment will be an example where a current measurement unit is provided for each arm.

Figure 4:
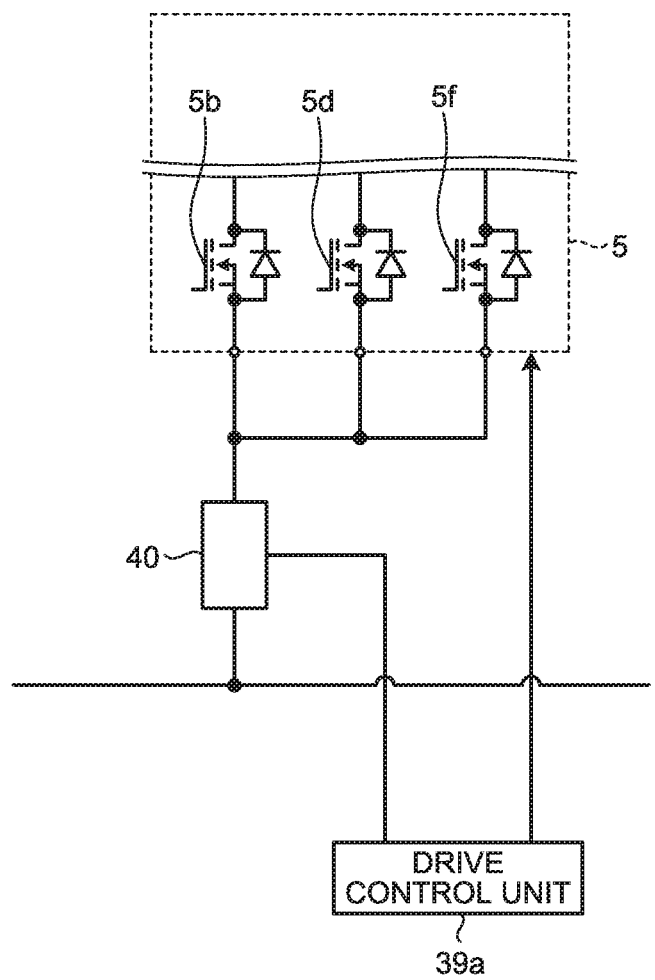
FIG. 4 is a diagram illustrating an example of the arrangement of a current measurement unit according to a second embodiment.

FIG. 4 is a diagram illustrating an example of the arrangement of a current measurement unit 40 according to the present embodiment. The current measurement unit 40 measures the current at a junction of lines connecting the switching elements 5b, 5d, and 5f in the lower arm of the inverter module 5 corresponding to the U phase. Although not shown in the figure, a current measurement unit measuring the current at a junction of lines connecting the switching elements 5a, 5c, and 5e in the upper arm is also provided on the side of the upper arm of the inverter module 5. As with the inverter module 5, a current measurement unit for measuring the current at a junction of lines connecting the switching elements 5b, 5d, and 5f in the lower arm and a current measurement unit for measuring the current at a junction of lines connecting the switching elements 5a, 5c, and 5e in the upper arm are also provided for each of the inverter modules 6 and 7. That is, a current measurement unit is provided for each arm in each phase.

The motor drive apparatus of the present embodiment is similar to the motor drive apparatus of the first embodiment except that the present embodiment includes the current measurement unit for each arm instead of the current measurement units 21 to 38 in the motor drive apparatus of the first embodiment and includes a drive control unit 39a instead of the drive control unit 39.

The current measurement unit 40 illustrated in FIG. 4 can detect a sum of currents flowing through the switching elements 5b, 5d, and 5f when the currents flow through all of the switching elements 5b, 5d, and 5f or when all of the switching elements 5b, 5d, and 5f are on. In contrast, in a state where the currents flow through all of the switching elements 5b, 5d, and 5f, the current measurement unit 40 cannot detect the current flowing through each of the switching elements 5b, 5d, and 5f individually.

Accordingly, in the present embodiment, a variation in element characteristics, i.e., on-resistances, of the switching elements 5b, 5d, and 5f is obtained by allowing the current to flow therethrough while modifying a combination of turning the switching elements 5b, 5d, and 5f on/off in a period during which the motor 8 is not operating normally. Specifically, the drive control unit 39a performs control such that the switching element 5b is turned on and the switching elements 5d and 5f are turned off. In this state, the drive control unit 39a acquires and stores the current value detected by the current measurement unit 40, or the value of the current flowing through the switching element 5b. Similarly, the drive control unit 39a turns on the switching element 5d and turns off the switching elements 5b and 5f in order to acquire and store the value of the current flowing through the switching element 5d as well as turning on the switching element 5f and turning off the switching elements 5b and 5d in order to acquire and store the value of the current flowing through the switching element 5f. On the basis of the currents that are detected, the drive control unit 39a can obtain the ratio of the on-resistances of the switching elements 5b, 5d, and 5f or the variation in the characteristics of the switching elements 5b, 5d, and 5f. The drive control unit 39a calculates and stores the ratio $R_{5b}:R_{5d}:R_{5f}$ of the on-resistances of the switching elements 5b, 5d, and 5f.

Similarly, as for the switching elements 5a, 5c, and 5e in the upper arm as well, the drive control unit 39a calculates and stores the ratio $R_{5a}:R_{5c}:R_{5e}$ of the on-resistances of the switching elements 5a, 5c, and 5e by allowing the current to flow therethrough while modifying a combination of turning the switching elements 5a, 5c, and 5e on/off. Similarly, for each of the inverter modules 6 and 7, the ratio of the on-resistances of the switching elements can be obtained for each arm.

In a period during which the motor 8 is operating normally, the drive control unit 39a of the inverter module 5 calculates the current, i.e., the branch current, flowing through each of the switching elements 5a, 5c, and 5e on the basis of the current detected by the current measurement unit in the upper arm and the ratio $R_{5a}:R_{5c}:R_{5e}$ of the on-resistances that is stored. The drive control unit 39a of the inverter module 5 then replicates the PWM signal Up input from the control unit 9 in order to generate three signals, adjusts the pulse width of the three signals on the basis of the calculated current flowing through each of the switching elements 5a, 5c, and 5e, and outputs PWM signals, the pulse width of which has been adjusted, to corresponding switching elements. The method of adjusting the pulse width on the basis of the current flowing through each of the switching elements 5a, 5c, and 5e is similar to that of the first embodiment.

Similarly, the drive control unit 39a of the inverter module 5 calculates the current, i.e., the branch current, flowing through each of the switching elements 5b, 5d, and 5f on the basis of the current detected by the current measurement unit 40 in the lower arm and the ratio $R_{5b}:R_{5d}:R_{5f}$ of the on-resistances that is stored. The drive control unit 39a of the inverter module 5 then replicates the PWM signal Un input from the control unit 9 in order to generate three signals, adjusts the pulse width of the three signals on the basis of the calculated current flowing through each of the switching elements 5b, 5d, and 5f, and outputs PWM signals, the pulse width of which has been adjusted, to corresponding switching elements. The method of adjusting the pulse width on the basis of the current flowing through each of the switching elements 5b, 5d, and 5f is similar to that of the first embodiment.

As with the inverter module 5, each of the inverter modules 6 and 7 replicates the PWM signal input from the control unit 9 and adjusts the pulse width according to the current for each arm of a corresponding phase, i.e., the V phase or the W phase.

Note that although the aforementioned example calculates the ratio of the on-resistances by allowing the current to flow while modifying the combination of turning the switching elements on/off in the period during which the motor 8 is not operating normally, the ratio of the on-resistances may instead be measured in advance and stored in the form of a table.

Alternatively, a temperature equivalent to the temperature of each switching element may be measured inside or outside the inverter module to obtain the ratio of the on-resistances of the switching elements on the basis of the measured temperature.

Although the aforementioned example includes the current measurement unit for each of the upper arm and the lower arm, the first embodiment and the present embodiment may be combined such that the current measurement unit is provided for each upper arm and for each switching element in the lower arm as described in the first embodiment or such that the current measurement unit is provided for each lower arm and for each switching element in the upper arm as described in the first embodiment.

The drive control unit 39a may also be divided into functions for respective phases to be included in the inverter modules as described in the first embodiment, or the drive control unit 39a may be integrated with the control unit 9.

Although the present embodiment illustrates an example of calculating the ratio of the on-resistances, the pulse may also be adjusted in accordance with a difference in switching timings that can be a cause of the current imbalance. The difference in the switching timings, for example, occurs when the threshold voltage of the elements varies, in which case the current is concentrated in an element that has a low threshold voltage and is turned on first at the time of turn-on and the current is concentrated in an element that has a high threshold voltage and is turned off last at the time of turn-off. The difference in the switching timings can be determined by measuring the current value after the lapse of a predetermined time from the rise of a drive signal, whereby an effect similar to that of the example of calculating the ratio of the on-resistances can be obtained by adjusting the pulse on the basis of the difference in the switching timings.

As described above, the present embodiment includes the current measurement unit for each arm in each inverter module and adjusts the pulse width of the PWM signals output to the switching elements on the basis of the current measured for each arm and the ratio of the on-resistances between the switching elements within the same arm. The current imbalance can thus be suppressed as with the first embodiment; therefore, the number of current measurement units can be reduced compared to the first embodiment so as to be able to achieve a reduction in the cost and size.

Third Embodiment

A motor drive apparatus according to a third embodiment of the present invention will now be described. Although the second embodiment illustrates an example where the current measurement unit measuring the current is provided for each arm, the present embodiment will illustrate an example where the motor drive apparatus includes a single current measurement unit.

Figure 5:
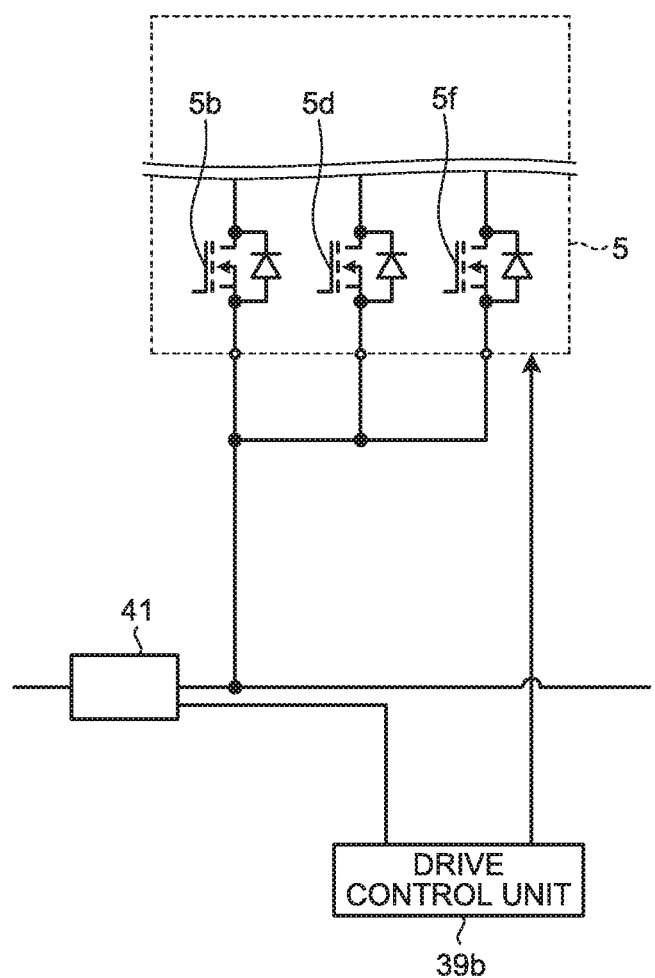
FIG. 5 is a diagram illustrating an example of the arrangement of a current measurement unit according to a third embodiment.

FIG. 5 is a diagram illustrating an example of the arrangement of a current measurement unit 41 according to the present embodiment. The current measurement unit 41 measures current flowing through the DC bus on the negative side. Although the current measurement unit 41 is provided on the DC bus on the negative side in FIG. 5, the current measurement unit may instead be provided on the DC bus on the positive side.

The motor drive apparatus of the present embodiment is similar to the motor drive apparatus of the second embodiment except that the present embodiment includes the current measurement unit 41 instead of the current measurement unit provided for each arm in the motor drive apparatus of the second embodiment and the present embodiment includes a drive control unit 39b instead of the drive control unit 39a. Note that the drive control unit 39b may be integrated with the control unit 9.

In the present embodiment, a variation in element characteristics, i.e., on-resistances, of switching elements is obtained for each of the inverter modules 5, 6, and 7 by allowing the current to flow therethrough while modifying a combination of turning the switching elements on/off in each of the inverter modules 5, 6, and 7 in a period during which the motor 8 is not operating normally. Specifically, in measuring the variation in the on-resistances of the switching elements in the upper arm of the U phase, i.e., the inverter module 5, the drive control unit 39b performs control such that the switching elements in the inverter modules 6 and 7 are turned off and the switching elements in a lower arm of the inverter module 5 are turned off. In this state, the combination of turning the switching elements in the upper arm of the inverter module 5 on/off is modified, whereby the ratio of the on-resistances of the switching elements in the upper arm of the inverter module 5 can be obtained as with the second embodiment. The ratio of the on-resistances of the switching elements in the lower arm of the inverter module 5 can be obtained in a similar manner. Similarly, for each of the inverter modules 6 and 7, the ratio of the on-resistances of the switching elements in the upper and lower arms can be obtained. The drive control unit 39b stores the ratio of the on-resistances as with the second embodiment.

Then, in a period during which the motor 8 is operating normally, the drive control unit 39b calculates the current, i.e., a branch current, flowing through each of the switching elements 5a, 5c, and 5e on the basis of the current detected by the current measurement unit 41 and the ratio of the on-resistances that is stored. The drive control unit 39b replicates the PWM signal input from the control unit 9, adjusts the pulse width of the replicated PWM signals, and outputs, to the switching elements, the PWM signals, the pulse width of which has been adjusted. Note that there is a period during which the switching elements in one arm of one phase are turned on while the motor 8 is operating normally, whereby the drive control unit 39b can measure the current for each arm by measuring the current in the period during which the switching elements are turned on for each arm and each phase. The drive control unit 39b can thus adjust the pulse width as with the second embodiment on the basis of the current detected by the current measurement unit 41 for each arm.

Note that although in the aforementioned example, the ratio of the on-resistances is calculated by allowing the current to flow while modifying the combination of turning of the switching elements on/off in the period during which the motor 8 is not operating normally, the ratio of the on-resistances may instead be measured in advance and stored in the form of a table.

As described above, the motor drive apparatus of the present embodiment includes one current measurement unit and adjusts the pulse width of the PWM signals output to the switching elements on the basis of the current measured by the current measurement unit and the ratio of the on-resistances between the switching elements in the same arm. The current imbalance can thus be suppressed as with the first embodiment; therefore, the number of current measurement units can be reduced compared to the first embodiment so as to be able to achieve a reduction in the cost and size.

Fourth Embodiment

A motor drive apparatus according to a fourth embodiment of the present invention will now be described. The motor drive apparatus of the present embodiment includes the three inverter modules 5, 6, and 7 described in the first, second, or third embodiment.

In the present embodiment, there will be described an example of the arrangement of the modules and a method of dissipating heat when the inverter modules 5, 6, and 7 described in the first, second, or third embodiment are provided. Although a single inverter module can have three phases in one module, the first or second embodiment includes three inverter modules and thus uses a larger number of heat dissipating fins than when one module is used.

Figure 6:
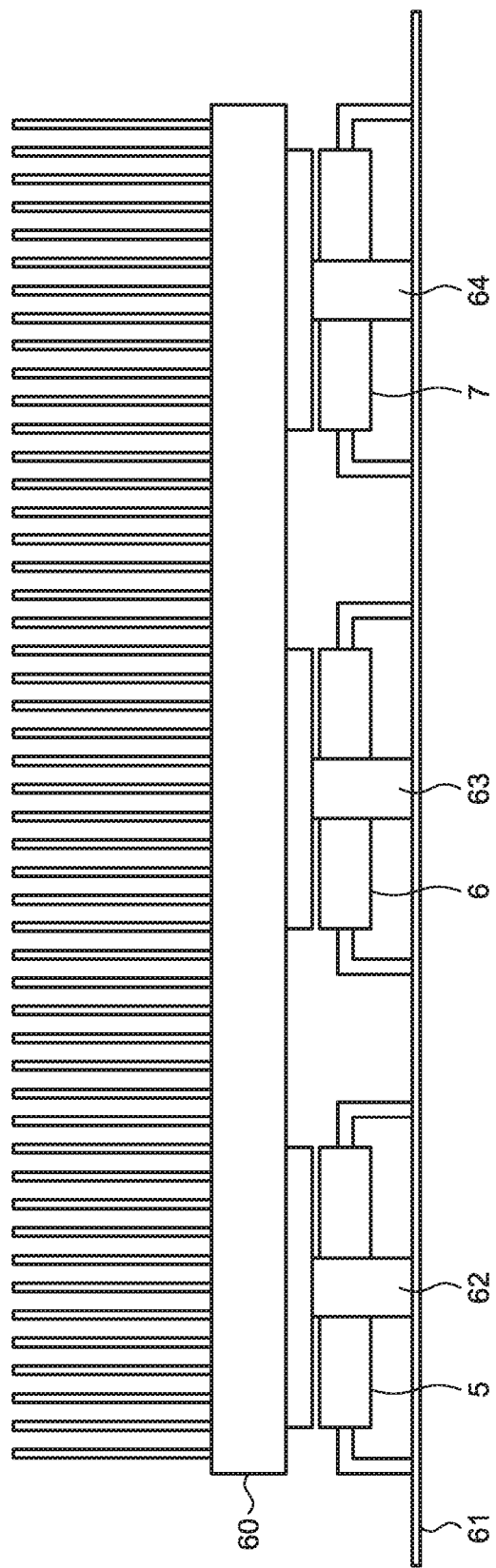
FIG. 6 is a diagram illustrating an example of the arrangement of a heat dissipation unit according to a fourth embodiment.

FIG. 6 is a diagram illustrating an example of the arrangement of a heat dissipation unit 60 having heat dissipating fins. FIG. 6 illustrates a state where the inverter modules 5, 6, and 7 are mounted on a substrate 61. Note that although FIG. 6 illustrates an example where the modules are mounted by using through holes, the modules may be surface mounted. When the heat dissipation unit 60 is installed across the three inverter modules, a difference in the height of the inverter modules causes a gap between the modules and the heat dissipation unit 60 and results in decreased heat dissipation efficiency. Accordingly, protrusions 62, 63, and 64 are provided as illustrated in FIG. 6 to accommodate the difference in the height. Alternatively, an auxiliary member for height alignment may be provided between the inverter modules 5, 6, and 7 and the substrate 61 to align the height of the three inverter modules. One auxiliary member may be provided in each module and there is no problem with providing three auxiliary members that are linked together. It is however desirable to connect the inverter modules 5, 6, and 7 and the heat dissipation unit 60 at a height a little lower than the height of the heat dissipating fins in order to avoid interference with other components mounted on the substrate 61. Note that the height alignment may be performed not only by the method described in the aforementioned example but by a method that uses a pressing member.

Moreover, as illustrated in FIG. 6, it is desirable to arrange the heat dissipation unit such that the longitudinal direction of the heat dissipating fins is orthogonal to the direction of the alignment of the inverter modules and that the direction along a passage of the cooling medium such as air or water is orthogonal to the direction of the alignment of the inverter modules. This can reduce the temperature variation as well as the amount of increase/decrease of the pulse width so as to be able to implement the amount of current that can be caused to flow through the inverter modules to near its limit. The difference in the temperature among the inverter modules can also be reduced. When the direction along the passage of the cooling medium such as air or water is parallel to the direction of the alignment of the inverter modules, the temperature variation may be reduced by increasing the pitch of the heat dissipating fins on the upstream side of the passage and reducing the pitch on the downstream side of the passage.

Moreover, as described in the first, second, or third embodiment, when one inverter module is used for each phase, the parallel configuration can be implemented within the module; therefore, the parallelization does not increase the inductance of the wiring and noise and a voltage surge can be suppressed.

Note that although FIG. 6 illustrates an example where the inverter modules 5, 6, and 7 are arranged side by side in the direction orthogonal to the direction of alignment of terminals of the inverter modules 5, 6, and 7 on the substrate 61, the inverter modules 5, 6, and 7 may be rotated 90 degrees from those in the example in FIG. 6 so as to be mounted such that the terminals of the three inverter modules 5, 6, and 7 are aligned.

Fifth Embodiment

Figure 7:
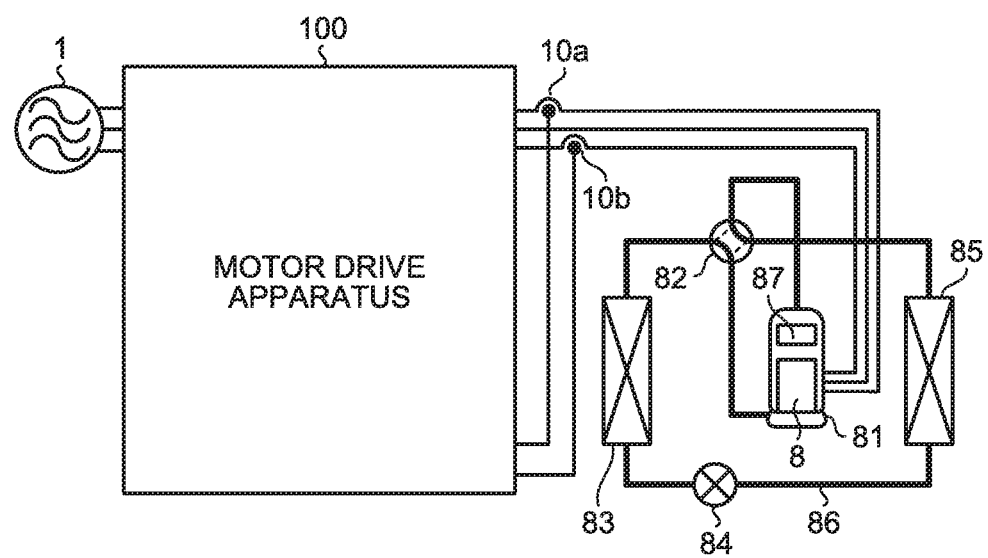
FIG. 7 is a diagram illustrating an example of the configuration of an air conditioner according to a fifth embodiment.

FIG. 7 is a diagram illustrating an example of the configuration of an air conditioner according to a fifth embodiment of the present invention. The air conditioner of the present embodiment includes the motor drive apparatus described in the first, second, or third embodiment. Although FIG. 7 illustrates an example where the air conditioner includes the motor drive apparatus 100 of the first embodiment, the air conditioner may include the motor drive apparatus of the second, third, or fourth embodiment instead of the motor drive apparatus 100 of the first embodiment. The air conditioner of the present embodiment forms a split air conditioner that has a refrigeration cycle in which a compressor 81 that includes the motor 8 of the first embodiment, a four-way valve 82, an outdoor heat exchanger 83, an expansion valve 84, and an indoor heat exchanger 85 are connected by using refrigerant piping 86.

A compression mechanism 87 compressing a refrigerant and the motor 8 operating the compression mechanism 87 are provided inside the compressor 81, from which the refrigerant is circulated through the outdoor heat exchanger 83 and the indoor heat exchanger 85 to form the refrigeration cycle that performs cooling and heating. Note that the configuration illustrated in FIG. 7 can be applied not only to the air conditioner but an appliance that has the refrigeration cycle such as a refrigerator or freezing machine.

The air conditioner of the present embodiment includes the motor drive apparatus described in the first to fourth embodiments and can thus achieve an increase in current at a low cost.

Moreover, a plurality of pairs of switching elements are provided for each phase; therefore, an operation can be continued by using any of the switching elements even when one of the switching elements fails. When a switching element fails, an operation such as issuing of an alarm to a user can be performed while continuing the operation at a lower performance level than usual.

The configurations described in the aforementioned embodiments illustrate examples of the content of the present invention and can be combined with another known technique or partly omitted or modified without departing from the gist of the present invention.

The invention claimed is:

1. A motor drive apparatus driving a motor, comprising:
a plurality of inverter modules equivalent in number to phases of the motor, the inverter modules each including a plurality of switching element pairs connected in parallel, each of the switching element pairs including two switching elements connected in series, the switching element pairs define upper and lower arms including an upper arm and a lower arm, the upper arm being defined by switching elements each being one of the two switching elements, the lower arm being defined by switching elements each being the other of the two switching elements;
a control unit generating a PWM signal used to drive each of the inverter modules with PWM; and
a drive control unit connected to the control unit for replicating the PWM signal to provide a plurality of PWM signals for driving the switching elements of each of the upper and lower arms of a corresponding one of the inverter modules,
wherein
the drive control unit changes pulse widths of the plurality of PWM signals by amounts based on a difference in values of currents flowing through the switching elements of each of the upper and lower arms of the corresponding inverter module.

2. The motor drive apparatus according to claim 1, further comprising a current measurement unit connected to each of the switching elements for detecting the values of the currents flowing through the switching elements of each of the upper and lower arms.

3. The motor drive apparatus according to claim 1, further comprising a current measurement unit connected to each of the upper and lower arms for detecting a sum of the currents flowing through the switching elements of each of the upper and lower arms.

4. The motor drive apparatus according to claim 1, further comprising a DC bus connected to the inverter modules and a single current measurement unit disposed on the DC bus for measuring a current flowing through the DC bus.

5. The motor drive apparatus according to claim 3, wherein the drive control unit obtains a characteristic of each of the switching elements of the upper and lower arms by measuring a current flowing through each of the switching elements of the upper and lower arms while the motor is not operating and the drive control unit calculates the values of the currents flowing through the switching elements of each of the upper and lower arms by using the sum of the currents detected by the current measurement unit and the obtained characteristic.

6. The motor drive apparatus according to claim 4, wherein the drive control unit obtains a characteristic of each of the switching elements of the upper and lower arms by measuring a current flowing through each of the switching elements of the upper and lower arms while the motor is not operating and the drive control unit calculates the values of the currents flowing through the switching elements of each of the upper and lower arms by using the current measured by the current measurement unit and the obtained characteristic.

7. The motor drive apparatus according to claim 1, further comprising a heat dissipation unit including a heat dissipating fin, wherein
the heat dissipation unit includes a protrusion to be connected to the inverter modules equivalent in number to the phases of the motor.

8. The motor drive apparatus according to claim 1, further comprising:
a heat dissipation unit including a heat dissipating fin; and
an auxiliary member connecting the heat dissipation unit and the inverter modules equivalent in number to the phases of the motor such that the inverter modules are connected at a same height.

9. The motor drive apparatus according to claim 7, wherein a passage of a cooling medium used to dissipate heat by the heat dissipating fin is orthogonal to a direction of alignment of the inverter modules.

10. The motor drive apparatus according to claim 8, wherein a passage of a cooling medium used to dissipate heat by the heat dissipating fin is orthogonal to a direction of alignment of the inverter modules.

11. The motor drive apparatus according to claim 1, wherein the switching elements are made from a wide band-gap semiconductor.

12. The motor drive apparatus according to claim 11, wherein the wide band-gap semiconductor is silicon carbide.

13. An air conditioner comprising:
the motor drive apparatus according to claim 1; and
a compressor including the motor driven by the motor drive apparatus.

14. A motor drive apparatus driving a motor, comprising:
a plurality of inverter modules equivalent in number to phases of the motor, the inverter modules each including a plurality of switching element pairs connected in parallel, each of the switching element pairs including first and second switching elements connected in series, the first switching elements of the respective switching element pairs defining an upper arm, the second switching elements of the respective switching element pairs defining a lower arm;
a current measurement unit connected to the switching elements of each of the upper and lower arms of a corresponding one of the inverter modules for measuring currents flowing through the switching elements of each arm;
a control unit generating a PWM signal used to drive the inverter modules with PWM; and
a drive control unit connected to the control unit for replicating plural PWM signals from the generated PWM signal, the replicated PWM signals turning on or off the switching elements of one of the upper and lower arms of a corresponding one of the inverter modules, wherein when the measured current flowing through a first one of the switching elements of one of the upper and lower arms is larger than the measured currents flowing through the remaining switching elements of the one arm, the drive control unit decreases a pulse width of the replicated PWM signal for turning on or off the first switching element and increases a pulse width of the replicated PWM signal for turning on or off at least one of the remaining switching elements, the amount of the decrease in the pulse width and the amount of the increase in the pulse width being based on a difference between the measured current flowing through the first switching element and the measured current flowing through the at least one of the remaining switching elements.

15. The motor drive apparatus according to claim 14, wherein an amount of the decrease in the pulse width is equal to an amount of the increase in the pulse width.

16. The motor drive apparatus according to claim 14, wherein the switching elements of the one arm are the first switching element, a second switching element and a third switching element, wherein when the measured current flowing through the first switching element is larger than the measured current flowing through the second switching element while the measured current flowing through the second switching element is larger than the measured current flowing through the third switching element, the drive control unit decreases a pulse width of the replicated PWM signal for turning on or off the first switching element and increases pulse widths of the replicated PWM signals for turning on or off the second and third switching elements, wherein an amount of the increase in the pulse width of the replicated PWM signal for turning on or off the second switching element is smaller than an amount of the increase in the pulse width of the replicated PWM signal for turning on or off the third switching element, and wherein a total of the amounts of the increase in the pulse widths is equal to the amount of the decrease in the pulse width.

* * * * *